Oct. 27, 1931.  E. A. STALKER  1,829,616

AIRPLANE

Filed March 28, 1929  2 Sheets-Sheet 1

INVENTOR
Edward A. Stalker
By Maréchal and Noé
Attorneys

Oct. 27, 1931.   E. A. STALKER   1,829,616
AIRPLANE
Filed March 28, 1929   2 Sheets-Sheet 2
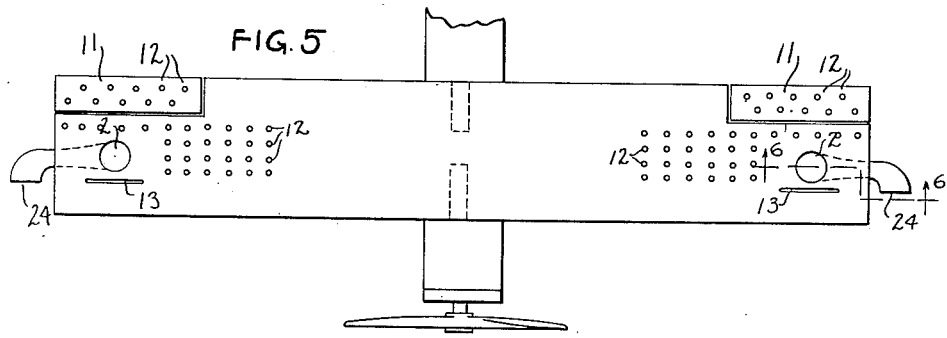
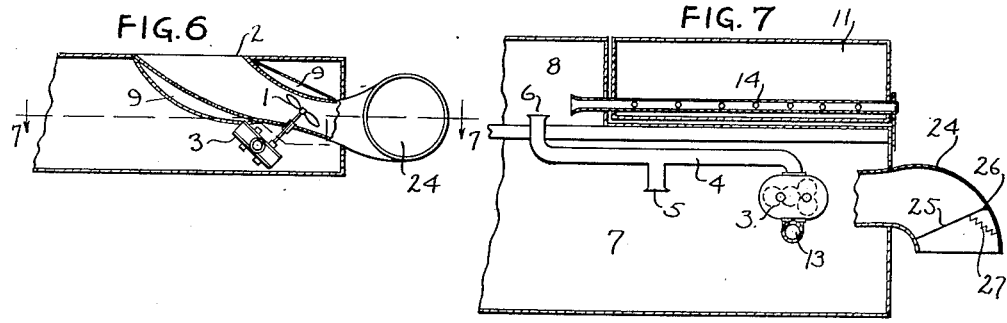
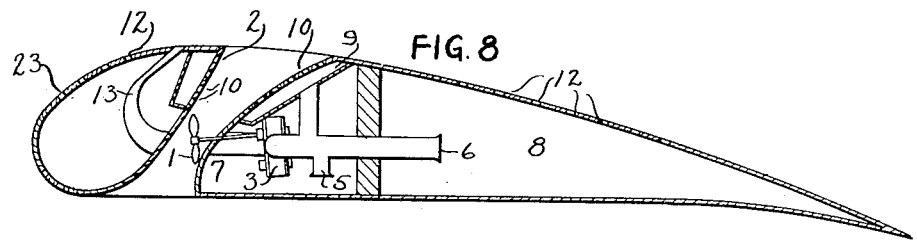
INVENTOR
Edward A. Stalker
By Maréchal and Noé
Attorneys Patented Oct. 27, 1931

1,829,616

UNITED STATES PATENT OFFICE

EDWARD A. STALKER, OF ANN ARBOR, MICHIGAN

AIRPLANE

Application filed March 28, 1929. Serial No. 350,537.

This invention relates to aircraft, and more particularly to means for increasing the effective airfoil action of sustaining planes and ailerons of airplanes.

One object of the invention is the provision of a novel means for increasing the lift of an airfoil particularly when at large angles of attack.

Another object of the invention is the provision of means for improving the aileron action and efficiency by removing the boundary layer of air from the surface of the aileron.

Other objects and advantages of the invention will be apparent from the following description and the accompanying drawings, in which Fig. 1 is a plan view of a portion of an airplane wing embodying the present invention;

Fig. 5 is a plan view of an airplane wing showing a modified form of the invention;

Fig. 6 is a vertical section on the line 6—6 of Fig. 5;

Fig. 7 is a horizontal section on the line 7—7 of Fig. 6; and

Fig. 8 is a vertical section through a thin wing embodying the present invention.

In the operation of sustaining planes or other airfoils it has been found that the air stream does not closely follow the contour of the wing on its upper surface, and that there is a loss of lift and a partial destruction of the efficiency of the wing by reason of the boundary layer of air which remains on the upper surface. This boundary layer of air, probably caused by the slowing up of the layer of air adjoining the upper wing surface by frictional effect, may be removed or sucked off by drawing it into the wing through openings in the wing surface, as set forth in my prior Patent No. 1,691,942. In accordance with the present invention, this case concerns the more effective withdrawal of the boundary layer of air so as to still further improve the efficiency of sustaining surfaces, and also ailerons or other airfoils.

Figure 1:
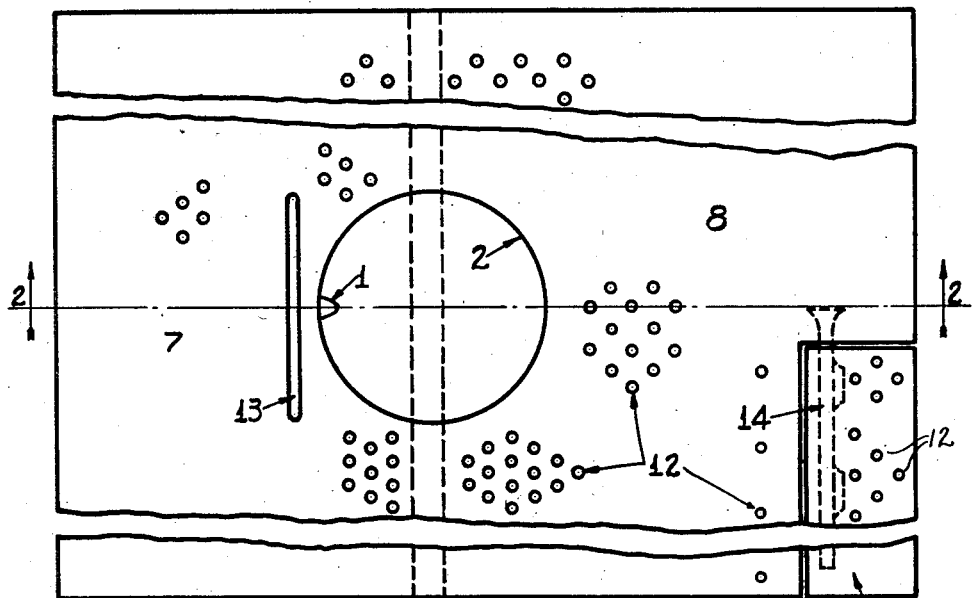
Figure 2:
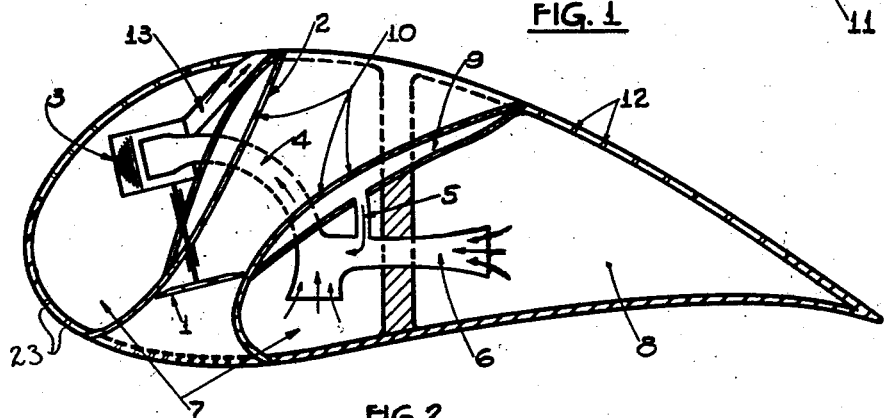
Fig. 2 is a vertical section on the line 2—2 of Fig. 1 showing the adaptation of the invention to a thick wing.

As shown in Figs. 1 and 2, in which the invention is applied to a thick wing, the wing is provided with a passage 2 extending through a part of the wing and having its exit at the upper surface of the wing. In this form of construction, the passage, which is preferably substantially Venturi shaped, extends downwardly and forwardly from its exit so that air may enter the lower entrance from the denser medium below the wing, and flow upwardly and rearwardly and exhaust itself above the upper wing surface where the air is in a rarer state. In the passage 2 is a prime mover preferably in the form of an impeller 1, this prime mover being adapted to be operated by the flow of air through the passage. The prime mover 1 is operably connected by the shaft on which it is mounted to a blower 3, preferably a blower of the "Roots" type having a pair of lobed intermeshing displacement members geared together so as to draw air through the ducts 4, 5 and 6 which lead to the compartments 7 and 8 of the wing and to a chamber 9 surrounding the wing passage 2. The upper surface of the wing is provided with openings 12 through which air may be inducted into the compartments 7 and 8 for the relief or withdrawal of the boundary surface of air and the consequent increase of the efficiency of the wing.

In accordance with the present invention an efficient flow of air through the wing passage 2 is obtained by sucking off the boundary layer of air, and is shown applied to the portions of the wing passage between its point of greatest restriction and its exit. The chamber 9 communicates with the passage 2 through a series of openings 10 in the passage walls so that the blower 3 in addition to sucking off the boundary layer of air from the top wing surface is also effective in sucking off the boundary layer of air on the passage walls. This has the effect of increasing the flow of air through the Venturi passage 2, and thus the power supplied to the impeller 1 is augmented.

To effectively utilize the exhaust flow of air from the blower 3, the exhaust of the blower may pass through a duct having its exit preferably in the form of a transverse slot 13 located as shown just ahead of the exit opening of the passage 2. The blast of air issuing from this slot 13 in the upper wing surface is thus utilized for the creation of a flow of air along the wing surface which speeds up the air flow along the top of the wing.

The airplane wing is provided with the usual aileron 11, movable relatively to the wing often at very large angles of attack for the control of the airplane; and the efficiency of the aileron itself in accordance with the present invention is materially improved by sucking off its boundary layer of air. For this purpose, holes are provided in the upper surface of the aileron, and there are openings in the torque tube 14 which forms the pivotal support of the aileron, this torque tube being preferably hollow so as to communicate with the chamber 8 of the wing. The aileron is movable to large angles of attack either above or below the wing, and it is with particular reference to airfoils operated at large angles of attack that this invention is most applicable. The boundary layer of air on the upper surface of the aileron itself is thus withdrawn into the aileron and then into the interior of the wing, by the blower 3.

Figure 4:
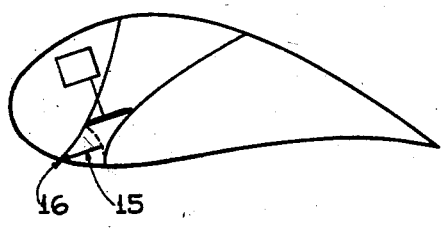
Fig. 4 is a diagrammatic representation of a form of the invention employing a control flap operable to close the passage through the wing.
Figure 3:
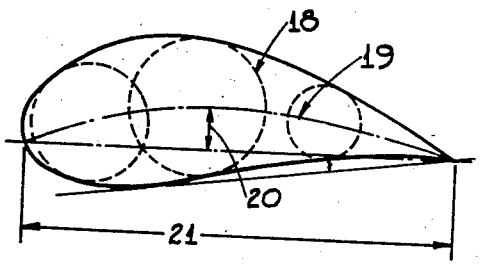
Fig. 3 is a diagrammatic showing of the geometric properties of the wing section of Fig. 2.

It has been found desirable in some instances during periods of relatively small pressure of differences between the exit and entrance air of passage 2 to close this passage. As shown in Fig. 4 this is accomplished by the gate or flap 15, hinged at 16 to the passage wall so it may be swung back into the passage, and acted upon by a spring which tends to normally close the gate during periods of reduced pressure difference. This spring, however, is comparatively weak so that the gate 15 may be opened automatically when the pressure difference reaches a substantial amount. When the gate 15 is closed the contour of the lower wing surface remains unbroken, but the gate operates automatically as soon as there is sufficient pressure difference to create an effective draft through the Venturi passage for the operation of the impeller 1.

In the form of construction just described, the invention has been disclosed as embodied in a comparatively thick wing in which the distance from the mean camber line 19 to the line adjoining the leading and trail edges is comparatively large. The mean camber line 19 is defined as the locus of the center of the circles 18 inscribed in the wing contour, and by thick wings is meant wings having a ratio between the maximum ordinate 20 and the chord length 21 which is of the order of 20% or more. In wings of this type even at small angles of attack, the air currents fail to follow the lower surface of the wing and this not only decreases the wing lift but also tends to destroy the effective aileron action, due to the formation of the boundary layer of relatively still air mentioned previously. By placing openings 23 in the wing surface near the leading edge, the area of still air collected there will be drawn into the compartment 7 and the efficiency of the wing will be thus increased.

The invention is, however, also applicable to comparatively thin airfoils. As shown in Fig. 8, the invention is applied to a thin wing in which the maximum thickness of the wing is of the order of 10% or less of its total chord length. In thin wings the Venturi shaped passage 2 is comparatively short, but this passage is of sufficient length for effective operation of the impeller 1 for the proper scavenging of the surface or boundary layer of air from the wing, where the Venturi-surface walls themselves are maintained substantially free of boundary dead air by reason of the openings in the passage walls previously referred to. In such wings it is important that the exit opening of the passage 2 be located well forward of the mid-wing position for most effective operation.

In Figs. 5, 6 and 7 is shown a modification of the invention in which the entrance of the substantially Venturi shaped passage through the wing is beyond the wing outline so that the air is collected by the forwardly facing collector or scoop 24 at the wing tip, where the air pressure is relatively high and the entrance of the air into the passage is substantially unobstructed. The passage 2 here extends laterally into the wing and then runs upwardly to the exit at the upper wing surface. The propeller 1 is provided in the restricted portion of this passage so as to drive the blower 3 which sucks the air from the interior of the wing and discharges it through the slot 13 in the same manner as shown in Figs. 1 and 2. If desired the collector or scoop 24 may be provided with a gate or valve 25 pivoted at 26 and urged to closed position by a weak spring 27, the pressure of the air normally keeping the valve open for effective operation of the propeller. In the form of construction shown in Figs. 5, 6 and 7, there is preferably a blower 3 at each side of the sustaining surface, near each wing tip. Preferably one side of the sustaining plane or wing shown in Fig. 5 is in communication with the other side so that should either blower fail for any reason, the other blower may withdraw air from the interior of the whole plane and from both ailerons. Preferably the blowers are of sufficient capacity so that either one alone will operate effectively for the removal of the boundary air surface from the wing and the ailerons.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A wing having a passage through a portion thereof with the exit of the passage at the upper surface of the wing, a prime mover in said passage operated by the flow of air therethrough, openings in the walls of said passage, and means operated by said prime mover for withdrawing air through said openings into the wing.

2. A wing having a passage through a portion thereof with the exit of the passage at the upper surface of the wing, a prime mover in said passage operated by the flow of air therethrough, openings in the upper surface of the wing and in the walls of said passage, and means operated by said prime mover for withdrawing air through all of said openings and discharging it externally of said wing.

3. A wing having a passage through a portion thereof the upper exit of the passage being at the upper surface of the wing and the entrance of the passage extending laterally into the wing, said wing having a continuous lower surface, a prime mover in said passage operated by the flow of air therethrough and means driven by said prime mover for removing the boundary layer of air from the wing surface.

4. A wing having a passage through a portion thereof with the exit of the passage at the upper surface of the wing, a prime mover in said passage operated by the flow of air therethrough, openings in the upper surface of the wing, means operated by said prime mover for drawing air through said openings into the wing for the removal of the boundary layer of air from the wing surface, and means for discharging the air so removed at the upper surface of the wing forward of its mid-portion and at a point separate from said passage.

5. A wing having a passage through a portion thereof with the exit of the passage at the upper surface of the wing, a prime mover in said passage operated by the flow of air therethrough, and means operated by said prime mover for discharging air rearwardly and upwardly along the upper surface of the wing and at a point exterior to said passage.

6. A wing having a passage through a portion thereof with the exit of the passage at the upper surface of the wing, a prime mover in said passage operated by the flow of air therethrough, means for automatically closing said passage and operable to open said passage upon predetermined difference in pressure between the entrance and the exit of the said passage, and means operated by said prime mover for withdrawing air into the wing through the upper surface thereof.

7. A thin wing having a thickness to chord length ratio less than 10% and having a passage through a portion thereof with the exit of the passage at the upper surface of the wing substantially forward of the middle of the wing, a prime mover in said passage operated by the passage of air therethrough, openings in said passage communicating with the interior of the wing, openings in the upper surface of the wing communicating with the interior thereof, and means driven by said prime mover for withdrawing air through said openings for the removal of the boundary layer of air from the passage walls and the upper surface of the wing.

In testimony whereof I hereto affix my signature.

EDWARD A. STALKER.